United States Patent
Wang et al.

(10) Patent No.: US 10,882,934 B2
(45) Date of Patent: Jan. 5, 2021

(54) PROPYLENE-BUTYLENE COPOLYMERS WITH IMPROVED MECHANICAL AND OPTICAL PROPERTIES AND BETTER PROCESSABILITY AS WELL AS ARTICLES MADE THEREFROM

(71) Applicant: Borealis AG, Vienna (AT)

(72) Inventors: Jingbo Wang, Engerwitzdorf (AT); Wilfried Töltsch, Marchtrenk (AT); Elisabeth Potter, Pasching (AT); Markus Gahleitner, Neuhofen/Krems (AT)

(73) Assignee: BOREALIS AG, Vienna (AT)

(*) Notice: Subject to any disclaimer, the term of this patent is extended or adjusted under 35 U.S.C. 154(b) by 136 days.

(21) Appl. No.: 16/304,898

(22) PCT Filed: Jun. 12, 2017

(86) PCT No.: PCT/EP2017/064258
§ 371 (c)(1),
(2) Date: Nov. 27, 2018

(87) PCT Pub. No.: WO2017/216093
PCT Pub. Date: Dec. 21, 2017

(65) Prior Publication Data
US 2019/0276571 A1    Sep. 12, 2019

(30) Foreign Application Priority Data

Jun. 16, 2016  (EP) .................................... 16174822

(51) Int. Cl.
*C08F 210/06*    (2006.01)
*C08F 4/654*     (2006.01)
*C08F 210/08*    (2006.01)
*C08F 4/649*     (2006.01)

(52) U.S. Cl.
CPC .......... *C08F 210/06* (2013.01); *C08F 4/6546* (2013.01); *C08F 210/08* (2013.01); *C08F 2500/08* (2013.01); *C08F 2500/12* (2013.01)

(58) Field of Classification Search
USPC ........................................................ 524/579
See application file for complete search history.

(56) References Cited

U.S. PATENT DOCUMENTS

| | | | |
|---|---|---|---|
| 5,618,895 A * | 4/1997 | Kerth et al. .......... | C08F 210/06 526/128 |
| 2011/0293867 A1 | 12/2011 | Bernreitner et al. | |
| 2013/0108814 A1* | 5/2013 | Guo et al. ............. | C08F 210/08 526/154 |

FOREIGN PATENT DOCUMENTS

| | | |
|---|---|---|
| EP | 2586801 A1 | 5/2013 |
| KR | 2015-0052804 A | 5/2015 |

OTHER PUBLICATIONS

International Search Report from PCT/EP2017/064258 dated Jun. 11, 2017.

* cited by examiner

*Primary Examiner* — Fred M Teskin
(74) *Attorney, Agent, or Firm* — Fay Sharpe LLP

(57) ABSTRACT

The present invention relates to nucleated propylene-butylene copolymers comprising propylene and butylene monomer units, wherein the nucleated propylene-butylene copolymer has improved stiffness, better impact behaviour and optical properties such as low haze and improved optomechanical ability.

10 Claims, No Drawings

PROPYLENE-BUTYLENE COPOLYMERS WITH IMPROVED MECHANICAL AND OPTICAL PROPERTIES AND BETTER PROCESSABILITY AS WELL AS ARTICLES MADE THEREFROM

This is a 371 of PCT Patent Application PCT/EP2017/064258 filed Jun. 12, 2017, which claims priority to European Patent Application Serial No. 16174822.3 filed Jun. 16, 2016, the contents of which are incorporated in their entirety herein.

BACKGROUND INFORMATION

The present invention relates to nucleated propylene-butylene copolymers comprising propylene and butylene monomer units, wherein the nucleated propylene-butylene copolymer has improved stiffness, better impact behaviour and optical properties such as low haze, and low amounts of soluble or extractable fractions and further show better processability.

The present invention further relates to final articles made of such nucleated propylene-butylene copolymers and the use of such nucleated propylene-butylene copolymers.

Polymers, like polypropylene, are increasingly used in different demanding applications. At the same time there is a continuous search for tailored polymers which meet the requirements of these applications and show good processability.

Polymers with higher stiffness can be converted to articles with lower wall thickness, allowing material and energy savings.

Polymers with good optical properties, especially low haze, are desired for consumer related articles to provide good "see-through" properties on the content of the packed goods.

Polymers with good impact behaviour are also desired in consumer related articles to safely keep the content even when dropped.

Good processability is required to ensure short production cycles or uniform filling of the moulds. This is especially important in the case of multi-cavity-tools, complex tool design or long flow path, as e.g. given in thin walled articles.

In several applications in the alimentary or medical industry low amounts of extractable fractions are crucial.

The demands can be challenging, since many polymer properties are directly or indirectly interrelated, i.e. improving a specific property can only be accomplished at the expense of another property.

Stiffness can for instance be improved by increasing the crystallinity and/or the relative amount of homopolymer within the composition. As a consequence, the material becomes more brittle, thereby resulting in poor impact properties and/or worse optical properties.

Impact behaviour or optical properties can be improved by increasing the comonomer content. As a consequence the material will become softer and loose on stiffness. Thus impact or optical properties such as haze behave in a conflicting manner to stiffness.

A polymer with increased comonomer(s) will have higher amount of soluble or extractable fractions. So impact and optical behaviour behave also in a conflicting manner to soluble content or extractability in the sense of Xylene solubles (XCS).

Processability depends on the molecular weight distribution (MWD) of the polymer used: a too small molecular weight distribution index means that the molecular weight distribution is narrow, so that the processing performance of the material becomes poor; and a too large molecular weight distribution index means that the molecular weight distribution is wide, so that the transparency of the material may be affected and reduced.

A polymer with increased MWD will inevitably show increased levels of soluble or extractable fractions, especially at high MFR-levels.

It is obvious for the person skilled, that also processability, optical behaviour and extractables are properties are closely interrelated, i.e. improving a specific property can only be accomplished on the expense of another property.

It is also a continuous need in the polymer industry, to provide polymers which show good processability, good impact behaviour and/or low haze, but still keep the amount of soluble or extractable polymer fractions as low as possible.

There is further a constant need in the industry to provide polymers which show good processability combined with good stiffness, good impact and good optical behaviour such as haze. Viewed from another aspect, it is desired to have polymers with a high ratio of stiffness/optical behaviour, like a high ratio of flexural modulus to haze.

Viewed from another aspect, it is a constant need to provide polymers which not only show improvements in one or two of these mechanical or optical properties. So it is desired to provide products with a well-balanced and continuously improved overall performance.

Such an improvement in the overall performance can be expressed by the optomechanical ability:

Optomechnical abilty (OMA) is understood as the ratio of mechanical (especially impact and flexural) behaviour to optical performance, namely haze, wherein the mechanical properties are targeted to be as high as possible and the optical performance such as haze is desired to be as low as possible.

The optomechanical ability can be determined by multiplying Flexural Modulus and notched impact strength and putting this product in relation to haze determined on 1 mm plaques:

The optomechanical ability is determined according the formula given below:

$$OMA = \frac{\text{Flex Modulus [MPa]} * NIS \left[\frac{kJ}{m^2}\right]}{\text{Haze (1 mm)[\%]}}$$

Such an improvement in the overall performance can be expressed also by the process focused optomechanical ability: (pOMA):

$$pOMA = \frac{\text{Flex Modulus} * \left(NIS + \frac{MFR}{100}\right)}{\text{Haze (1 mm)}}$$

Up to now all such nucleated propylene-butylene copolymer compositions mentioned above are produced using a Ziegler-Natta catalyst, in particular a high yield Ziegler-Natta catalyst (so called fourth and fifth generation type to differentiate from low yield, so called second generation Ziegler-Natta catalysts), which comprises a catalyst component, a co-catalyst component and an internal donor based on phthalate-compositions.

Examples for such catalysts are in particular disclosed in U.S. Pat. No. 5,234,879, WO92/19653, WO 92/19658 and WO 99/33843, incorporated herein by reference.

However, some of these phthalate-compositions are under suspicion of generating negative health and environmental effects. Furthermore, there is an increasing demand on the market for "phthalate-free polypropylene" suitable for various applications, e.g. in the field of packaging and medical applications as well as personal care, or personal hygiene.

WO 2012007430 also incorporated herein by reference, is one example of a limited number of patent applications, describing phthalate free catalysts based on citraconate as internal donor.

DESCRIPTION OF THE PRIOR ART

EP2586801 relates to a propylene-butene-1 random copolymer which has a butene-1 content of 1-6 mol % and a relative dispersity of butene-1, as determined according to NMR method, of greater than 98.5%. The propylene-butene-1 random copolymer of the present invention has a high relative dispersity of butene-1, as well as better transparency and heat resistance, so that it is more suitable for packaging food that may be edible after heating. Moreover, the copolymer has a lower xylene solubles content at room temperature. The patent however is not concerned with increasing the stiffness of the polymer, nor with providing any polymers with improved stiffness/impact/haze balance or improved processability.

EP 15171769, filed 12 Jun. 2015, is a process application for copolymerization of C3 and higher alpha-olefins (C4/C6), co- and terpolymers with phthalate free Sirius catalyst in the Borstar PP process. An MFR of 1-50 g/10 min is combined with C4-C8 4.5-14 wt % & optionally C2 0.5-3.0 wt %, the target application are films.

EP 15174579, filed 30 Jun. 2015, describes the use of ZN-PP catalysts and tert-alkyl-methoxysilanes for propylene-butylene co- and terpolymers.

Neither patent is concerned with improving any mechanical properties or any optomechanical behaviour.

OBJECT OF THE INVENTION

So the present inventors have sought to provide a nucleated propylene-butylene copolymer, which can be easily processed, shows improved mechanical and optical behaviour in the sense of higher Flexural Modulus, better Impact strength and better optical properties or in the sense of better ratios of stiffness to haze performance or in the sense of better optomechanical ability and which at the same time has low levels of extractable fractions.

The present inventors have now surprisingly identified a nucleated propylene-butylene-copolymer which
i) has been produced in the presence of a Ziegler-Natta catalyst and is
ii) free of phthalic acid esters as well as their respective decomposition products, and comprises—based on the total weight of the propylene-butylene copolymer—
A. 88.0-96.0 wt.-% of propylene
B. 4.0-12.0 wt.-% of 1-butylene,
wherein the nucleated propylene-butylene copolymer is further characterised by
a) a molecular weight distribution (MWD) of at least 5.0 when measured according to ISO16014
b) and fulfills any of the following requirements:
c1) Flexural Modulus of at least 1000 MPa when measured according to ISO178 or
c2) Notched Impact strength of at least 3.0 kJ/m$^2$ when measured according to ISO179/1eA+23° C. or
c3) Haze of at most 21.0% when measured according to ASTM 1003-D on 1 mm plaques or
c4) ratio of Flex Modulus/Haze of at least 60 MPa/% or
c5) an optomechanical ability (OMA) or a process focused optomechanical ability (pOMA) of at least 200.

In a special embodiment the present invention is directed to nucleated propylene-butylene copolymer with high flowability.

In a further special embodiment the invention deals with nucleated propylene-butylene copolymers with improved optomechanical ability (OMA)

In still a further special embodiment the invention deals with nucleated propylene-butylene copolymers with improved process focused optomechanical ability (pOMA).

The present inventions in a further special embodiment deals with articles made out of the nucleated propylene-butylene-copolymer which can be used for alimentary, household, medical and diagnostic applications.

The present invention in a further special embodiment deals with packaging articles, made out of the nucleated propylene-butylene-copolymer, e.g. thin walled containers.

The present inventions in a further special embodiment deals with the use of nucleated propylene-butylene copolymer of the present invention in medical, diagnostic, household or alimentary applications.

DETAILED DESCRIPTION

As used herein, the term propylene-butylene copolymer encompasses polymers being polymerised from propylene, and butylene monomer units. So the nucleated propylene-butylene copolymer consists thereof of propylene and butylene monomer units. The nucleated propylene-butylene copolymer is understood to be free of ethylene derived monomer units.

The nucleated propylene-butylene copolymer of the present invention comprises—based on the total weight of the propylene-butylene copolymer 88.0-96.0 wt.-% of propylene and 4.0-12.0 wt.-% of 1-butylene.

The amount of butylene in the nucleated propylene-butylene copolymer is at most 12.0 wt.-% or below, such as 11.0 wt.-%, or 9.5 wt.-% or 8.0 wt.-% or below.

The amount of butylene in the nucleated propylene-butylene copolymer is at least 4.0 wt.-% such as 5.0 wt.-% or higher. Especially preferred is an amount of butylene of at least 6.0 wt.-% or higher, such as 7.0 or 7.5 wt.-% or higher.

The nucleated propylene-butylene copolymers of the present invention are random copolymers. It is meant herein that the comonomer(s) are distributed randomly along the polymer chain.

The MFR 230° C./2.16 kg of the nucleated propylene-butylene copolymer is preferably at least 10.0 g/10 min, at least 12.0 or 15.0 g/10 min or higher.

The MFR of the nucleated propylene-butylene copolymer is more preferably in the range of 20.0 g/10 min or above, such as 35 or 50 g/10 min or higher, such as 65 or 75 g/10 min or higher.

The MFR of the nucleated propylene-butylene copolymer can be preferably 200.0 g/10 min or below, such 150.0 g/10 min, 135.0 g/10 min or 22.0 g/10 min or below.

Especially preferred are MFR-ranges of 10-200 g/10 min, like 15-150 g/10 min, 35-135 g/10 min, or 50-130 g/10 min.

The Flexural Modulus of the nucleated propylene-butylene copolymer of the current invention can be at least 1000

MPa, such as 1050 MPa, 1100 or 1170 MPa, 1300 or 1400 MPa or above when measured according to ISO178. A reasonable upper limit for the Flexural Modulus is 2000 MPa.

The Notched Impact Strength NIS of the present nucleated propylene-butylene copolymer can be at least 3.0 kJ/m$^2$ or above, such as 4.0 kJ/m$^2$; 4.6 or 5.2 kJ/m$^2$, or 5.9 kJ/m$^2$ or above when measured according to ISO179/1eA at +23° C. A reasonable upper limit for the NIS is 50 kJ/m$^2$.

Haze of the nucleated propylene-butylene copolymer of the present invention can be 21.0% or below when measured on 1 mm plaques, such as 18.0%, or 16.0 or 12.5% or below.

The nucleated propylene-butylene copolymer of the present invention is characterised by a pronounced balance of stiffness to optical properties, expressed in the ratio of Flexural Modulus to Haze (Flex/Haze).

This Flex/Haze ratio can be at least 60.0 MPa/% or higher, such as at least 64.0 MPa/%; 70.0 MPa/%; 76.0 MPa/%; 82.0 MPa/% or 85.0 MPa/%.

Especially preferred are Flex/Haze ratios of 90.0 MPa/% or higher, such as 100.0 MPa/%, 105.0 MPa/% or 110.0 MPa/% or above.

Optomechanical ability (OMA) is understood as the ratio of mechanical (especially impact and flexural) behaviour, to optical performance, namely haze, wherein the mechanical properties are targeted to be as high as possible and the optical performance is desired to be as low as possible.

The optomechanical ability is determined according the formula given below:

$$OMA = \frac{\text{Flex Modulus [MPa]} * NIS \left[\frac{kJ}{m^2}\right]}{\text{Haze (1 mm)[\%]}}$$

The optomechanical ability can be at least 200 or higher, such as 260, 300 or 350 or higher. Preferably values are at least 400, such as 480, 530, or 600 or above.

The process focused optomechanical ability (pOMA) can be determined as given in Formula 2 below:

$$pOMA = \frac{\text{Flex Modulus} * \left(NIS + \frac{MFR}{100}\right)}{\text{Haze (1 mm)}}$$

The process focused optomechanical ability (pOMA) can be at least 200 or higher, such as 260, 300 or 350 or higher. Preferably values are at least 400, such as 450, 500, 550 or 600 or above.

Preferred are nucleated propylene-butylene copolymers which are characterised by fulfilling any two of the following requirements:
 a) Flexural Modulus of at least 1000 MPa when measured according to ISO178 or
 b) Notched Impact strength of at least 3.0 kJ/m$^2$ when measured according to ISO 179/1eA+23° C. or
 c) Haze of at most 21.0% when measured according to ASTM 1003-D on 1 mm plaques or
 d) ratio of Flex Modulus/Haze of at least 60 MPa/% or
 e) an optomechanical ability of at least 200.

Further preferred are nucleated propylene-butylene copolymers of the present invention which have
 Flexural Modulus of at least 1000 MPa and a Haze of at most 21.0% or
 Flexural Modulus of at least 1000 MPa and a NIS of at least 3.0 kJ/m$^2$ or
 Flexural Modulus of at least 1000 MPa and a ratio of Flex Modulus/Haze of at least 60 MPa/%
 Flexural Modulus of at least 1000 MPa and an optomechanical ability (OMA) of at least 200 or
 Flexural Modulus of at least 1000 MPa and a process focused optomechanical ability (pOMA) of at least 200.

Further preferred are nucleated propylene-butylene copolymers of the present invention which have
 NIS of at least 3.0 kJ/m$^2$ and a Haze of at most 21.0%
 NIS of at least 3.0 kJ/m$^2$ and a ratio of Flex Modulus/Haze of at least 60 MPa/%
 NIS of at least 3.0 kJ/m$^2$ and a an optomechanical ability (OMA) or a process focused optomechanical ability (pOMA) of at least 200

Further preferred are nucleated propylene-butylene copolymers of the present invention which have
 Haze of at most 21.0% and a ratio of Flex Modulus/Haze of at least 60 MPa/%
 Haze of at most 21.0% and an optomechanical ability (OMA) or a process focused optomechanical ability (pOMA) of at least 200

Polymerisation Process

The polymer of the present invention can be produced by any known polymerisation process, regardless whether these are single-stage or multi-stage processes, such as slurry or gas phase processes.

In case of multistage processes a preferred process is a "loop-gas phase"-process, such as developed by Borealis N S, Denmark (known as BORSTAR® technology) is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of LyondellBasell Industries.

Catalyst

A possible catalyst for being used in the production of the nucleated polypropylene composition is described herein:

The catalyst is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a phthalate or preferably a non-phthalic compound, preferably a non-phthalic acid ester, still more preferably being a diester of non-phthalic dicarboxylic acids as described in more detail below. Thus, the catalyst is in a preferred embodiment fully free of undesired phthalic compounds. Further, the solid catalyst is free of any external support material, like silica or MgCl$_2$, but the catalyst is self-supported.

The Ziegler-Natta catalyst (ZN-C) can be further defined by the way as obtained. Accordingly, the Ziegler-Natta catalyst (ZN-C) is preferably obtained by a process comprising the steps of a)
a$_1$) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or
a$_2$) a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or a₃) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; or a₄) providing a solution of Group 2 alkoxide of formula $M(OR_1)_n(OR_2)_mX_{2-m-n}$, or mixture of Group 2 alkoxides $M(OR_1)_nX_{2-n'}$ and $M(OR_2)_{m'}X_{2-m'}$, where M is Group 2 metal, X is halogen, $R_1$ and $R_2$ are different alkyl groups of $C_2$ to $C_{16}$ carbon atoms, and $0 \leq n < 2$, $0 \leq m < 2$ and $n+m+(2-n-m)=2$, provided that both n and m≠0, $0 < n' \leq 2$ and $0 < m' \leq 2$; and b) adding said solution from step a) to at least one compound (TC) of a transition metal of Group 4 to 6 and c) obtaining the solid catalyst component particles, and adding an internal electron donor (ID), preferably a non-phthalic internal donor (ID), at any step prior to step c).

The internal donor (ID) or precursor thereof is thus added preferably to the solution of step a) or to the transition metal compound before adding the solution of step a).

According to the procedure above the Ziegler-Natta catalyst (ZN-C) can be obtained via precipitation method or via emulsion—solidification method depending on the physical conditions, especially temperature used in steps b) and c). Emulsion is also called in this application liquid/liquid two-phase system.

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx), especially the solution of $a_2$).

Preferably the Group 2 metal (MC) is magnesium.

The magnesium alkoxy compounds as defined above can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_2$-$C_{16}$ alkyl residue, preferably $C_4$ to $C_{10}$, more preferably C6 to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, most preferably 4:1 to 1:4.

Magnesium alkoxy compound may be a reaction product of alcohol(s), as defined above, and a magnesium compound selected from dialkyl magnesium, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesium are used. Most preferred dialkyl magnesium are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesium, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane and or with $TiCl_4$ Washing solutions can also contain donors and/or compounds of Group 13, like trialkyl aluminum, halogenated alky aluminum compounds or alkoxy aluminum compounds. Aluminum compounds can also be added during the catalyst synthesis. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 µm, preferably 10 to 100. Particles are compact with low porosity and have surface area below 20 g/m², more preferably below 10 g/m². Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 2610270 and EP2610272 which are incorporated here by reference.

The Ziegler-Natta catalyst is preferably used in association with an alkyl aluminum cocatalyst and optionally external donors.

As further component in the instant polymerisation process an external donor (ED) is preferably present. Suitable external donors (ED) include certain silanes, ethers, esters, amines, ketones, heterocyclic compounds and blends of these. It is especially preferred to use a silane.

Specific examples of such silanes are
dicyclopentyl-dimethoxy silane (CAS 126990-35-0),
cyclohexyl(methyl) dimethoxy silane (CAS 17865-32-6),
trimethoxy (1.1.2-trimethylpropyl) silane (i.e. thexyl trimethoxy silane, CAS 142877-45-0) or
tert-butyl dimethoxy (methyl) silane (CAS 18293-81-7)
Nucleating Agent:

The nucleated propylene-butylene copolymer of the present invention is preferably alpha-nucleated and comprises nucleating agents, preferably alpha-nucleating agents.

The nucleating agent comprised by the nucleated propylene-butylene copolymer of the present invention is preferably a alpha-nucleating agent or clarifying agent.

The nucleating agent present in the nucleated propylene-butylene copolymer of the current invention can be selected from the group consisting of:
(i) salts of monocarboxylic acids and polycarboxylic acids, e.g. aluminum tert-butylbenzoate; and
(ii) dibenzylidenesorbitol (e.g. 1,3:2,4 dibenzylidenesorbitol) and C1-C8-alkyl-substituted dibenzylidenesorbitol derivatives, such as methyldibenzylidenesorbitol, ethyldibenzylidenesorbitol or dimethyldibenzylidenesorbitol (e.g. 1,3 2,4 di(methylbenzylidene) sorbitol), or substituted nonitol-derivatives, such as 1,2,3,-trideoxy-4, 6:5,7-bis-O-[(4-propylphenyl)methylene]-nonitol, or and benzene-trisamides like substituted 1,3,5-benzenetrisamides as N,N',N"-tris-tert-butyl-1,3,5-benzenetricarboxamide, N,N',N"-tris-cyclohexyl-1,3,5-benzene-tricarboxamide and N-[3,5-bis-(2,2-dimethyl-propionylamino)-phenyl]-2,2-dimethyl-propionamide; wherein 1,3 2,4 di(methylbenzylidene) sorbitol is preferred and
(iii) salts of diesters of phosphoric acid, e.g. aluminium-hydroxy-bis[2,2'-methylene-bis(4,6-di-t-butylphenyl) phosphate], and hydroxybis (2,4,8,10-tetra-tert-butyl-6-hydroxy-12Hdibenzo(d,g)(1,3,2) dioxaphosphocin 6-oxidato) aluminium.

It is envisaged within the present invention that also mixtures of alpha-nucleating agents can be used.
Article As used herein the term "moulded article" is intended to encompass articles that are produced by any conventional moulding technique, e.g. injection moulding, stretch moulding, compression moulding, rotomoulding or injection stretch blow moulding.

The term is not intended to encompass articles that are produced by casting or extrusion, such as extrusion blow moulding. Thus the term is not intended to include films or sheets.

Articles produced by injection moulding, stretch moulding, or injection stretch blow moulding are preferred. Articles produced by injection moulding are especially preferred.

The articles preferably are thin-walled articles having a wall thickness of 300 micrometer to 2 mm. More preferably the thin-walled articles have a wall thickness of 300 micrometer to 1400 micrometer, and even more preferably the thin-walled articles have a wall thickness of 300 micrometer to 900 micrometer.

The articles of the current invention can be containers, such as cups, buckets, beakers, trays or parts of such articles, such as see-through-windows, lids, or the like.

The articles of the current invention are especially suitable for containing food, especially frozen food, such as ice-cream, frozen liquids, sauces, pre-cooked convenience products, and the like. Articles of the current invention are also suitable for medical or diagnostic purposes, such as syringes, beaker, pipettes, etc It is however envisaged in the present invention, that the articles made of the nucleated propylene-butylene copolymer may comprise further ingredients, such as additives (stabilisers, lubricants, colorants) or polymeric modifiers, even comprising other monomer units, such as ethylene based polymers.

The present invention will now be described in further detail by the examples provided below:

EXAMPLES

Measuring Methods
$MFR_2$ (230° C.) is measured according to ISO 1133 (230° C., 2.16 kg load).
Comonomer Content by IR Spectroscopy The content of 1-butene was measured by quantitative Fourier transform infrared spectroscopy (FTIR), on films having a thickness of between 260 and 300 µm.

Spectra have been recorded in transmission mode. Relevant instrument settings include a spectral window of 5000 to 400 wave-numbers (cm-1), a resolution of 2.0 cm-1 and 16 scans.

The butene content of the propylene-butene copolymers was determined using the baseline corrected peak maxima of a quantitative band at 767 cm-1, with the baseline defined from 1945 to 625 cm-1. The comonomer content in mol % was determined using a film thickness method using the intensity of the quantitative band I767 (absorbance value) and the thickness (T, in cm) of the pressed film using the following relationship:

mol % $C4 = [(I767/T) - 1.8496]/1.8233$  (Equation 1)

Xylene Cold Soluble fraction at room temperature (XCS, wt.-%) is determined at 25° C. according to ISO 16152; 5$^{th}$ edition; 2005-07-01.

Molecular Weight Distribution (MWD)

The molecular weight distribution is the ratio of (Mw/Mn), wherein Mn is the number average molecular weight and Mw is the weight average molecular weight) is measured by a method based on ISO 16014-1:2003 and ISO 16014-4:2003.

A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling into the GPC instrument.

Overall Migration

Overall Migration is determined according to EN ISO 1186-14:2002 on injection moulded plaques, 60×60×1 mm$^3$.

C6 Pharm

The hexane extractable fraction is determined according to the European Pharmacopeia 6.0 EP613. Test bar specimens of 80×10×4 mm$^3$ injection molded at 23° C. in line with EN ISO 1873-2 were used in an amount of 10 g, and the extraction was performed in 100 ml n-hexane by boiling under reflux for 4 h, followed by cooling in ice water for 45 min. The resulting solution is filtered under vacuum in less than 5 min, followed by evaporation under nitrogen stream. After drying the evaporation residue it is weighed and the hexane extractable fraction calculated.

Flexural Modulus:

The flexural modulus was determined in 3-point-bending at 23° C. according to ISO 178 on 80×10×4 mm$^3$ test bars injection moulded in line with EN ISO 1873-2.

Notched Impact Strength

The Charpy notched impact strength (NIS) was measured according to ISO 179 1eA at +23° C., using injection moulded bar test specimens of 80×10×4 mm$^3$ prepared in accordance with ISO 294-1:1996.

Haze

Haze is determined according to ASTM D1003-00 on 60×60×1 mm$^3$ plaques injection molded in line with EN ISO 1873-2.

Optomechnical Ability (OMA) and Process Focused Optomechanical Ability (pOMA)

Optomechanical ability (OMA) is understood as the ratio of mechanical (especially impact and flexural) behaviour, to optical performance, namely haze, wherein the mechanical properties are targeted to be as high as possible and the optical performance is desired to be as low as possible.

The optomechanical ability is determined according the formula given below:

$$OMA = \frac{\text{Flex Modulus [MPa]} * NIS \left[\frac{kJ}{m^2}\right]}{\text{Haze (1 mm)[\%]}} \quad \text{Formula 1}$$

Accordingly the process focused optomechanical ability: pOMA can be determined as given in Formula 2 below:

$$pOMA = \frac{\text{Flex Modulus} * \left(NIS + \frac{MFR}{100}\right)}{\text{Haze (1 mm)}} \quad \text{Formula 2}$$

Material Description:

All products were stabilized with 0.1 wt.-% of Irganox B225 (1:1-blend of Irganox 1010 and Irgafos 168) of BASF AG, Germany), 0.05 wt.-% calcium stearate and 2000 ppm Millad 3988 (Name: 1,3:2,4 Bis(3,4-dimethylbenzylidene) sorbitol).

The mixture of polymer and additives was then extruded to pellets by using a PRISM TSE 16, L/D ratio of screw is 25 extruder under nitrogen atmosphere and final polymer properties were measured.

Catalyst 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25° C. Mixing speed was adjusted to 170 rpm. 26.0 g of Mg-complex prepared above was added within 30 minutes keeping the temperature at 25° C. 3.0 ml of Viscoplex® 1-254 and 1.0 ml of a toluene solution with 2 mg Necadd447™ was added. Then 24.0 ml of heptane was added to form an emulsion.

Mixing was continued for 30 minutes at 25° C., after which the reactor temperature was raised to 90° C. within 30 minutes. The reaction mixture was stirred for a further 30 minutes at 90° C.

Afterwards stirring was stopped and the reaction mixture was allowed to settle for 15 minutes at 90° C. The solid material was washed 5 times:

Washings were made at 80° C. under stirring for 30 min with 170 rpm. After stirring was stopped the reaction mixture was allowed to settle for 20-30 minutes and followed by siphoning.

Wash 1: Washing was made with a mixture of 100 ml of toluene and 1 ml donor

Wash 2: Washing was made with a mixture of 30 ml of TiCl4 and 1 ml of donor.

Wash 3: Washing was made with 100 ml of toluene.
Wash 4: Washing was made with 60 ml of heptane.
Wash 5: Washing was made with 60 ml of heptane under 10 minutes stirring.

Afterwards stirring was stopped and the reaction mixture was allowed to settle for 10 minutes while decreasing the temperature to 70° C. with subsequent siphoning, followed by N2 sparging for 20 minutes to yield an air sensitive powder.

Ti content was 3.76 wt-%
External Donor:
In the Examples, the external donors as disclosed below were used as indicated
D: Dicyclopentyl dimethoxy silane CAS 126990-35-0
T3: tert-butyl dimethoxy(methyl) silane CAS: 18293-81-7

As can be seen from the values in above, the inventive examples show clear advantages in view of mechanical and optical properties. They have well balanced ratio of flexural Modulus to haze, special high values in the optomechanical ability and provide good processability at low levels of extractable fractions.

All the polymers showed good processability when injection molded into articles having a wall thickness of 1 mm.

The invention claimed is:

1. A nucleated propylene-butylene-copolymer which
   i) has been produced in the presence of a Ziegler-Natta catalyst and is
   ii) free of phthalic acid esters, and comprises, based on the total weight of the propylene-butylene copolymer,
      A. 88.0-96.0 wt.-% of propylene; and
      B. 4.0-12.0 wt.-% of 1-butylene,

TABLE 1

Polymerisation Data

|  |  | IE1 | IE2 | IE3 | IE4 | IE5 | IE6 | IE7 | IE8 | IE9 | CE1 |
|---|---|---|---|---|---|---|---|---|---|---|---|
| Ti content | wt % | 2.55 | 2.55 | 3.76 | 2.55 | 3.76 | 3.76 | 3.76 | 3.76 | 2.55 |  |
| Donor type |  | D | D | D | D | D | D | T3 | T3 | T3 | C |
| Al/Ti | molar | 200 | 200 | 200 | 200 | 200 | 200 | 200 | 200 | 200 |  |
| Al/Do | molar | 10 | 10 | 10 | 10 | 10 | 10 | 10 | 10 | 10 |  |
| D/Ti | molar | 20 | 20 | 20 | 20 | 20 | 20 | 20 | 20 | 20 | 21 |
| Prepoly Temperature | ° C. | 20 | 20 | 20 | 20 | 20 | 20 | 20 | 20 | 20 | 28 |
| Prepo time | min | 10 | 10 | 6 | 6 | 6 | 10 | 6 | 6 | 10 | 30 |
| H2 | NL | 47.6 | 33.9 | 14.95 | 14.95 | 13.1 | 14.92 | 10.25 | 10.24 | 2.5 |  |
| Time transition prepo-Bulk | min | 15 | 15 | 19 | 19 | 18 | 18 | 19 | 20 | 18 |  |
| C4/C3 ratio | g/g | 0.23 | 0.23 | 0.18 | 0.24 | 0.29 | 0.38 | 0.26 | 0.13 | 0.23 |  |
| Bulk temperature | ° C. | 70 | 70 | 80 | 80 | 70 | 70 | 80 | 80 | 70 | 65 |
| time | min | 60 | 60 | 60 | 60 | 60 | 60 | 60 | 60 | 60 |  |
| Tm | ° C. | 142.4 | 142.6 | 150.7 | 148.4 | 147.1 | 141.3 | 140.6 | 149.9 | 142.4 |  |
| Tc | ° C. | 104 | 103.7 | 108.2 | 103.0 | 102.6 | 99.6 | 99.1 | 108.3 | 100.9 |  |

|  | Ext Donor | C4 [wt %] | MFR 230/2.16 [g/10 min] | XCS [wt %] | NIS ISO 179/1eA [kJ/m$^2$] | Flexur [MPa] | Haze (1 [%] |
|---|---|---|---|---|---|---|---|
| IE1 | T3 | 7.7 | 128 | 3.5 | 3.5 | 1293 | 12 |
| IE2 | T3 | 7.8 | 67 | 3.2 | 4.4 | 1237 | 11 |
| IE3 | D | 4.6 | 11 | 1.7 | 4.3 | 1484 | 13.3 |
| IE4 | D | 5.6 | 12 | 1.82 | 4.7 | 1388 | 15.5 |
| IE5 | D | 6.6 | 17 | 2.5 | 4.9 | 1344 | 20.4 |
| IE6 | D | 8.7 | 8 | 3.4 | 6.3 | 1183 | 13.1 |
| IE7 | T3 | 8.6 | 12 | 1.9 | 6.5 | 1200 | 11.7 |
| IE8 | T3 | 4.6 | 12 | 1.6 | 4.4 | 1468 | 16.8 |
| IE9 | T3 | 7.7 | 0.9 | 2.9 | 8.3 | 1117 | 14.2 |
| CE1 | C | 3.2 C2 | 98 | 11.6 | 3.5 | 1041 | 20 |
| CE2 | D | 0 | 11 | 2 | 2.5 | 1777 | 32 |

|  | Flex/Haze [Mpa/%] | OMA * [(kJ*MPA)/(m$^2$ * %)] | pOMA | MWD | Overall migration | C6 -Pham |
|---|---|---|---|---|---|---|
| IE1 | 107.8 | 372 | 510 | 6.1 | 2 | 0.33 |
| IE2 | 112.5 | 491 | 567 | 6.2 | 1.6 | n.m. |
| IE3 | 111.6 | 481 | 493 | 6.8 | n.m. | 0.19 |
| IE4 | 89.5 | 424 | 434 | 6.1 | n.m. | n.m. |
| IE5 | 65.9 | 322 | 333 | 6.9 | 1.3 | 0.46 |
| IE6 | 90.3 | 565 | 573 | 6.1 | n.m. | n.m. |
| IE7 | 102.6 | 662 | 674 | 5.2 | 1.5 | 0.39 |
| IE8 | 87.4 | 381 | 391 | 5.7 | 1.2 | 0.2 |
| IE9 | 78.8 | 655 | 655 | 6.1 | 1.2 | n.m. |
| CE1 | 52.1 | 182 | 233 | 6.7 | 11 | 1.6 |
| CE2 | 55.5 | 139.4 | 145 | 7.5 | n.m. | 0.17 |

* OMA: optomechanical ability
** pOMA process focused optomechanical ability
CE1 is a propylene-ethylene random copolymer with 3.2 wt.-% of ethylene and 0% butene.
CE2 is a propylene homopolymer produced in the presence of the catalyst as disclosed above and Donor D wherein the nucleated propylene-butylene copolymer is further characterised by:
a) a molecular weight distribution (MWD) of at least 5.0 when measured according to ISO16014,
b) and fulfils any of the following requirements:
   c1) Flexural Modulus of at least 1000 MPa when measured according to ISO178 or
   c2) Notched Impact strength of at least 3.0 kJ/m$^2$ when measured according to ISO 179/1eA+23° C. or
   c4) ratio of Flex Modulus/Haze of at least 60 MPa/% or
   c5) an optomechanical ability or a process focused optomechanical ability of at least 200.

2. A nucleated propylene-butylene copolymer according to claim 1 further characterized by a MFR 230/2.16 of at least 10.0 g/10 min when measured according to ISO113.

3. A nucleated propylene-butylene copolymer according to claim 1 further characterized by a Notched Impact strength of at least 3.0 kJ/m$^2$ when measured according to ISO 179/1eA+23° C.

4. A nucleated propylene-butylene copolymer according to claim 1 further characterized by a Haze of at most 21.0% when measured according to ASTM 1003-D on 1 mm plaques.

5. A nucleated propylene-butylene copolymer according to claim 1 further characterized by a ratio of Flex Modulus/Haze of at least 60 MPa/%.

6. A nucleated propylene-butylene copolymer according to claim 1 further characterized by a optomechanical ability or a process focused optomechanical ability of at least 200.

7. A nucleated propylene-butylene copolymer according to claim 1, fulfilling any two of the following requirements:
   Flexural Modulus at least 1000 MPa when measured according to ISO178; or
   Notched Impact strength at least 3.0 kJ/m$^2$ when measured according to ISO 179/1eA+23° C.; or
   Haze of at most 21.0% when measured according to ASTM 1003-D on 1 mm plaques; or
   ratio of Flex Modulus/Haze of at least 60 MPa/%; or
   an optomechanical ability of at least 200.

8. A nucleated propylene-butylene copolymer according to claim 1 which has been produced in the presence of a Ziegler-Natta catalyst and an internal donor selected from (di)esters of non-phthalic carboxylic (di)acids, 1,3-diethers, and mixtures thereof.

9. Moulded article comprising nucleated propylene-butylene copolymer according to claim 1.

10. Method for the use of the nucleated propylene-butylene copolymer according to claim 1 in medical, diagnostic, household or alimentary applications.

* * * * *